United States Patent
Agari et al.

(10) Patent No.: US 7,209,770 B2
(45) Date of Patent: Apr. 24, 2007

(54) POWER SUPPLY IC HAVING SWITCHING REGULATOR AND SERIES REGULATOR

(75) Inventors: Hideki Agari, Osaka (JP); Kohji Yoshii, Hyogo (JP)

(73) Assignee: Ricoh Company, Ltd., Tokyo (JP)

( * ) Notice: Subject to any disclaimer, the term of this patent is extended or adjusted under 35 U.S.C. 154(b) by 403 days.

(21) Appl. No.: 10/726,626

(22) Filed: Dec. 4, 2003

(65) Prior Publication Data

US 2004/0135626 A1 Jul. 15, 2004

(30) Foreign Application Priority Data

Dec. 13, 2002 (JP) .............................. 2002-362149

(51) Int. Cl.
*H04B 1/38* (2006.01)
*H04M 1/00* (2006.01)

(52) U.S. Cl. ................ 455/572; 455/127.1; 455/343.1; 323/282; 323/351

(58) Field of Classification Search ................ 455/572, 455/127.1, 343.1; 323/270–272, 282, 351; 361/18, 748; 327/538, 540
See application file for complete search history.

(56) References Cited

U.S. PATENT DOCUMENTS

| 5,479,089 A | 12/1995 | Lee |
| 5,563,499 A | 10/1996 | Pinney |
| 6,236,194 B1 | 5/2001 | Manabe et al. |
| 6,424,128 B1 * | 7/2002 | Hiraki et al. ............... 323/268 |
| 6,438,462 B1 | 8/2002 | Hanf et al. |
| 6,683,767 B2 * | 1/2004 | Ito et al. ...................... 361/56 |
| 7,003,270 B2 * | 2/2006 | Maruo et al. ............... 455/113 |
| 2002/0042902 A1 | 4/2002 | Kinoshita et al. |

OTHER PUBLICATIONS

Dowlatabadi, A.B., Challenges In CMOS Mixed-Signal Designs For Analog Circuit Designers, Circuits and Systems, 1997. Proceedings of the 40th Midwest Symposium on Sacramento, CA, USA, Aug. 3-6, 1997. New York, NY, USA, IEEE Aug. 3, 1997, pp. 47-50.

Sicard, E., et al., Cross-Talk Extraction from Mask Layout. Design Automation, 1993, with the European Event in ASIC Design. Proceedings. Y4th European Conference on Paris, France, Feb. 22-25, 1993. Los Alamitos, CA, USA, IEEE Computer Soci, Feb. 22, pp. 414-418.

* cited by examiner

*Primary Examiner*—Nguyen T. Vo
(74) *Attorney, Agent, or Firm*—Dickstein Shapiro LLP

(57) ABSTRACT

An integrated circuit for supplying power includes an IC chip having a rectangular shape and having a first edge and a second edge opposite the first edge, a switching regulator implemented on the IC chip and having a driver transistor whose ON time of switching is controlled to adjust an output voltage of the switching regulator, and a series regulator implemented on the IC chip, wherein the driver transistor of the switching regulator is positioned near the first edge, and the series regulator is positioned near the second edge.

13 Claims, 10 Drawing Sheets

POWER SUPPLY IC HAVING SWITCHING REGULATOR AND SERIES REGULATOR

BACKGROUND OF THE INVENTION

1. Field of the Invention

The present invention generally relates to a power supply IC having a plurality of power supply circuits, and particularly relates to a power supply IC having a series regulator for supplying power to high-frequency circuits and a switching regulator. The invention also relates to a communication apparatus in which such a power supply IC is employed.

2. Description of the Related Art

The operating voltage of logic circuits such as CPUs and DSPs has dropped, from 2.5 V to 1.8 V or to 1.5 V, for example, in line with the development of portable equipment that requires low power consumption. There is a continuing trend toward a lower operating voltage. For the purpose of supplying power to an IC that requires a low-voltage operation, a switching regulator is considered more suitable than a conventional series regulator due to its high efficiency. There is also a strong need for the miniaturization of portable equipment. An analog circuit including a power supply unit, which is conventionally provided as a separate chip, is now integrated into one chip to achieve such miniaturization.

In communication apparatus such as cellular phones, however, a switching regulator that functions as a noise source needs to be provided as a separate chip, separate from a power supply unit of the RF circuit that suffers trouble if affected by high-frequency noise. There should be provided some distance between these chips on the printed circuit board, or a filter should be provided between the chips, as a counter measure against the noise.

In order to obviate the problems as described above, there is a need for a power supply IC in which a switching regulator generating high-frequency noise and a series regulator for RF circuits are provided on a single chip, and also a need for a communication apparatus in which such a power supply IC is employed.

SUMMARY OF THE INVENTION

It is a general object of the present invention to provide an integrated circuit and a communication apparatus that substantially obviate one or more problems caused by the limitations and disadvantages of the related art.

Features and advantages of the present invention will be presented in the description which follows, and in part will become apparent from the description and the accompanying drawings, or may be learned by practice of the invention according to the teachings provided in the description. Objects as well as other features and advantages of the present invention will be realized and attained by an integrated circuit and a communication apparatus particularly pointed out in the specification in such full, clear, concise, and exact terms as to enable a person having ordinary skill in the art to practice the invention.

To achieve these and other advantages in accordance with the purpose of the invention, the invention provides an integrated circuit for supplying power, including an IC chip having a rectangular shape and having a first edge and a second edge opposite the first edge, a switching regulator implemented on the IC chip and having a driver transistor whose ON time of switching is controlled to adjust an output voltage of the switching regulator, and a series regulator implemented on the IC chip, wherein the driver transistor of the switching regulator is positioned near the first edge, and the series regulator is positioned near the second edge.

According to another aspect of the invention, the series regulator includes a driver transistor whose conductivity of an ON state is controlled to adjust an output voltage of the series regulator.

According to another aspect of the invention, the series regulator supplies power to a high-frequency circuit.

According to another aspect of the invention, the switching regulator and the series regulator receive a positive power supply voltage through respective different pads.

According to another aspect of the invention, the switching regulator and the series regulator receive a negative power supply voltage through respective different pads.

According to another aspect of the invention, the integrated circuit as described above further includes additional circuitry situated between the driver transistor of the switching regulator and the series regulator.

According to another aspect of the invention, the driver transistor of the switching regulator and the series regulator are positioned near opposite corners of the IC chip.

According to another aspect of the invention, the driver transistor of the switching regulator and the series regulator are positioned near a diagonal line of the IC chip.

According to another aspect of the invention, the switching regulator functions as a DC—DC converter of a synchronous detection type.

According to another aspect of the invention, a communication apparatus includes an IC chip having a rectangular shape and having a first edge and a second edge opposite the first edge, a switching regulator implemented on the IC chip and having a driver transistor whose ON time of switching is controlled to adjust an output voltage of the switching regulator, a series regulator implemented on the IC chip, wherein the driver transistor of the switching regulator is positioned near the first edge, and the series regulator is positioned near the second edge, and a RF circuit unit including a transceiver for radio communication.

According to another aspect of the invention, the series regulator supplies power to the RF circuit.

According to another aspect of the invention, the switching regulator and the series regulator receive a positive power supply voltage through respective different pads.

According to another aspect of the invention, the switching regulator and the series regulator receive a negative power supply voltage through respective different pads.

According to another aspect of the invention, the communication apparatus as described above further includes additional circuitry situated between the driver transistor of the switching regulator and the series regulator.

According to another aspect of the invention, the driver transistor of the switching regulator and the series regulator are positioned near opposite corners of the IC chip.

According to another aspect of the invention, the driver transistor of the switching regulator and the series regulator are positioned near a diagonal line of the IC chip.

According to another aspect of the invention, the switching regulator functions as a DC—DC converter of a synchronous detection type.

In the integrated circuit for supplying power as described above, the driver transistor of the switching regulator is situated near an edge of the IC chip, and the series regulator is situated near the opposite edge of the IC chip. This provision reduces an effect of the noise generated by the switching regulator on the series regulator, thereby allowing the switching regulator and the series regulator to be implemented on a single IC. Further, an effect of the noise generated by the switching regulator is reduced on the high-frequency circuit that receives power from the series regulator. This improves the reliability of the power supply integrated circuit.

In the communication apparatus as described above, the driver transistor of the switching regulator is situated near an edge of the IC chip, and the series regulator is situated near the opposite edge of the IC chip. This provision reduces an effect of the noise generated by the switching regulator on the series regulator, thereby reducing an effect on the signal processing of the high-frequency circuit that receives power from the series regulator, and also allowing the switching regulator and the series regulator to be implemented on a single IC. This helps to achieve the miniaturization of the communication apparatus.

Other objects and further features of the present invention will be apparent from the following detailed description when read in conjunction with the accompanying drawings.

DESCRIPTION OF THE PREFERRED EMBODIMENTS

In the following, embodiments of the present invention will be described with reference to the accompanying drawings.

Figure 1:
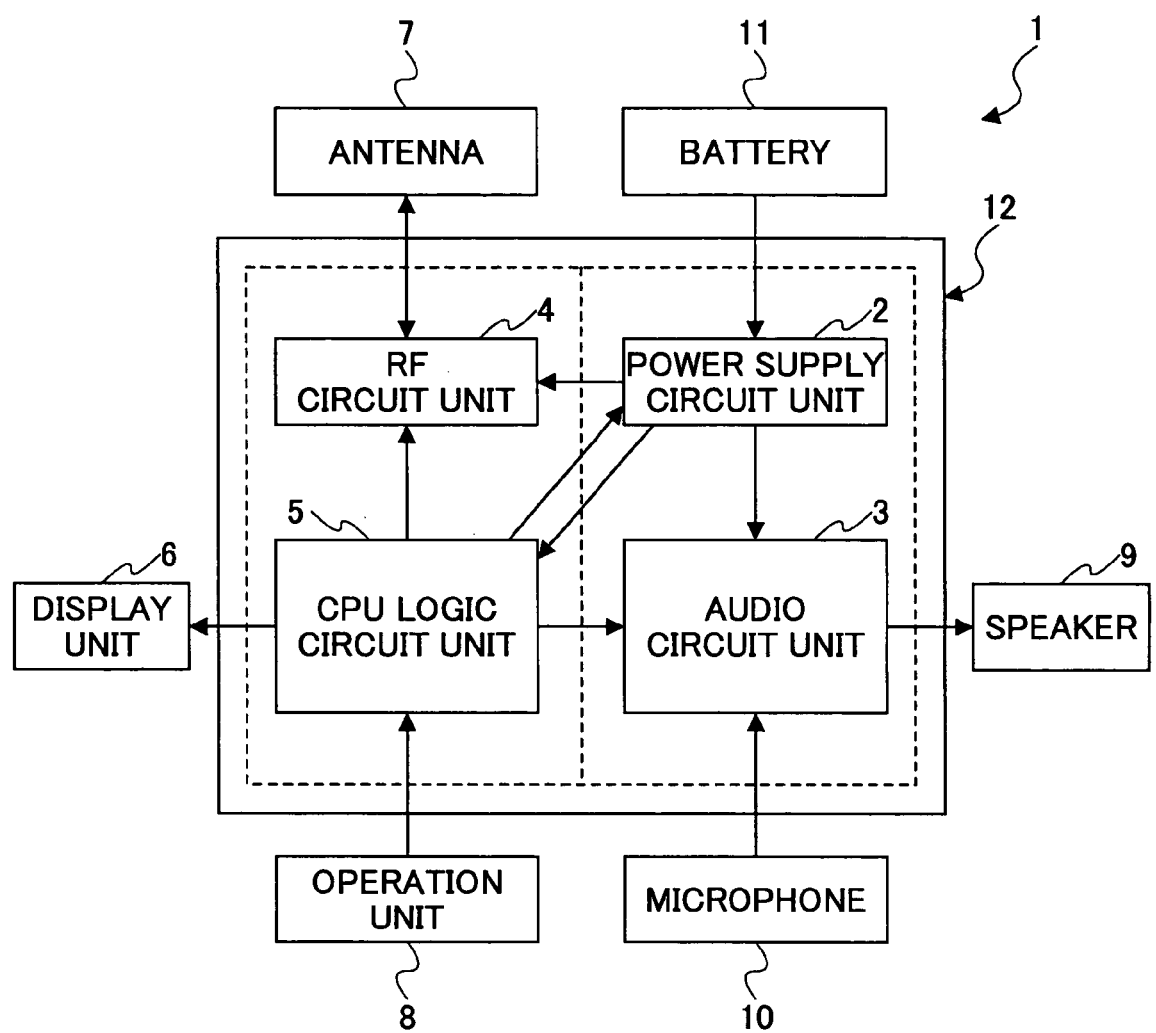
FIG. 1 is a block diagram showing an example of a communication apparatus in which a power supply IC according to a first embodiment of the invention is used.

FIG. 1 is a block diagram showing an example of a communication apparatus in which a power supply IC according to a first embodiment of the invention is used. In FIG. 1, a cellular phone is shown as an example of a communication apparatus.

In FIG. 1, a communication apparatus 1 includes a power supply circuit unit 2 having a plurality of power supply circuits, an audio circuit unit 3, a RF circuit unit 4 comprised of transceiver circuits and the like, a CPU logic circuit unit 5 for controlling the power supply circuit unit 2, the audio circuit unit 3, and the RF circuit unit 4, a display unit 6, an antenna 7, an operation unit 8 comprised of operation buttons, a speaker 9, a microphone 10, and a battery 11. The power supply circuit unit 2, the audio circuit unit 3, the RF circuit unit 4, and the CPU logic circuit unit 5 are molded on a single substrate, creating a single module 12.

The power supply circuit unit 2 generates a predetermined constant voltage from the power supplied from the battery 11, and supplies power to the audio circuit unit 3, the RF circuit unit 4, and the CPU logic circuit unit 5. The CPU logic circuit unit 5 responds to instruction from the operation unit 8 by controlling the operations of the power supply circuit unit 2, the audio circuit unit 3, the RF circuit unit 4, and the display unit 6. The RF circuit unit 4 transmits and receives signals through the antenna 7. The audio circuit unit 3 receives signals from the microphone 10, and outputs signals to the speaker 9.

Figure 2:
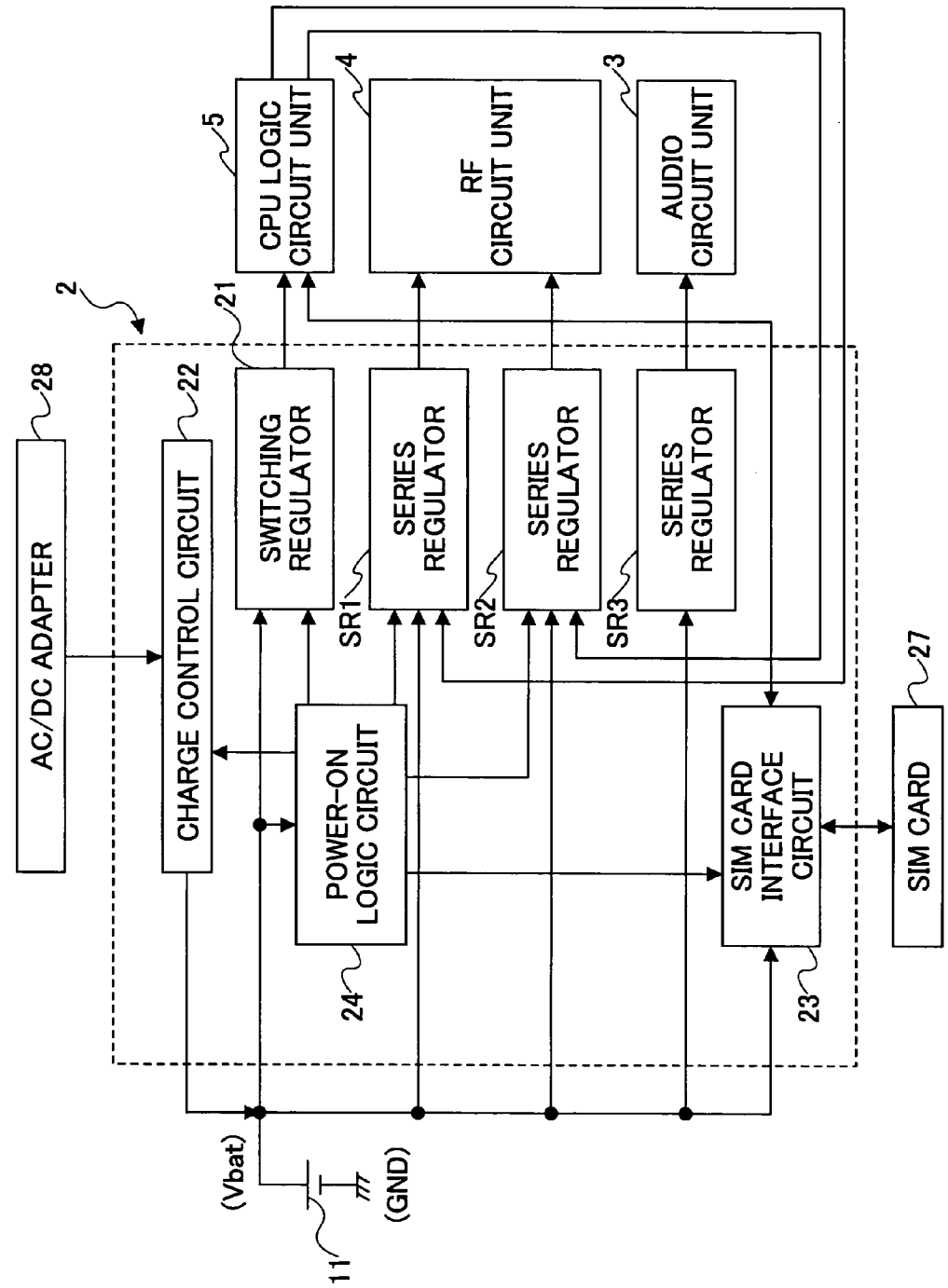
FIG. 2 is a block diagram showing an example of the construction of a power supply circuit unit shown in FIG. 1.

FIG. 2 is a block diagram showing an example of the construction of the power supply circuit unit 2 shown in FIG. 1. FIG. 2 illustrates an example in which one switching regulator and three series regulators are provided. In FIG. 2, the power supply circuit unit 2 includes a switching regulator 21, series regulators SR1–SR3, a charge control circuit 22 for controlling the charging of the battery 11, and an SIM card interface circuit 23 for providing an interface between an SIM card 27 and the CPU logic circuit unit 5.

The power supply circuit unit 2 further includes a power-on logic circuit 24, which controls the operations of the switching regulator 21, the series regulators SR1–SR3, the charge control circuit 22, and the SIM card interface circuit 23 in response to a positive power supply voltage Vbat supplied from the battery 11. The power supply circuit unit 2 is integrated as a single IC, except for few components which cannot be integrated. This IC serves as a power supply IC.

The switching regulator 21, the series regulators SR1–SR3, and the SIM card interface circuit 23 receives power from the battery 11. The power-on logic circuit 24 monitors a positive power supply voltage Vbat of the battery 11. The charge control circuit 22 receives a DC voltage from an AC/DC adapter 28, and controls the charging of the battery 11 using the DC voltage.

The power-on logic circuit 24 instructs the charge control circuit 22 to suppress the charging of the battery 11 if the positive power supply voltage Vbat of the battery 11 exceeds a predetermined level. The switching regulator 21 supplies power to the CPU logic circuit unit 5. The series regulators SR1 and SR2 supply power to the RF circuit unit 4. The series regulator SR3 supplies power to the audio circuit unit 3. The series regulators SR1 and SR2 are controlled by the CPU logic circuit unit 5 as to their enable status.

Figure 3:
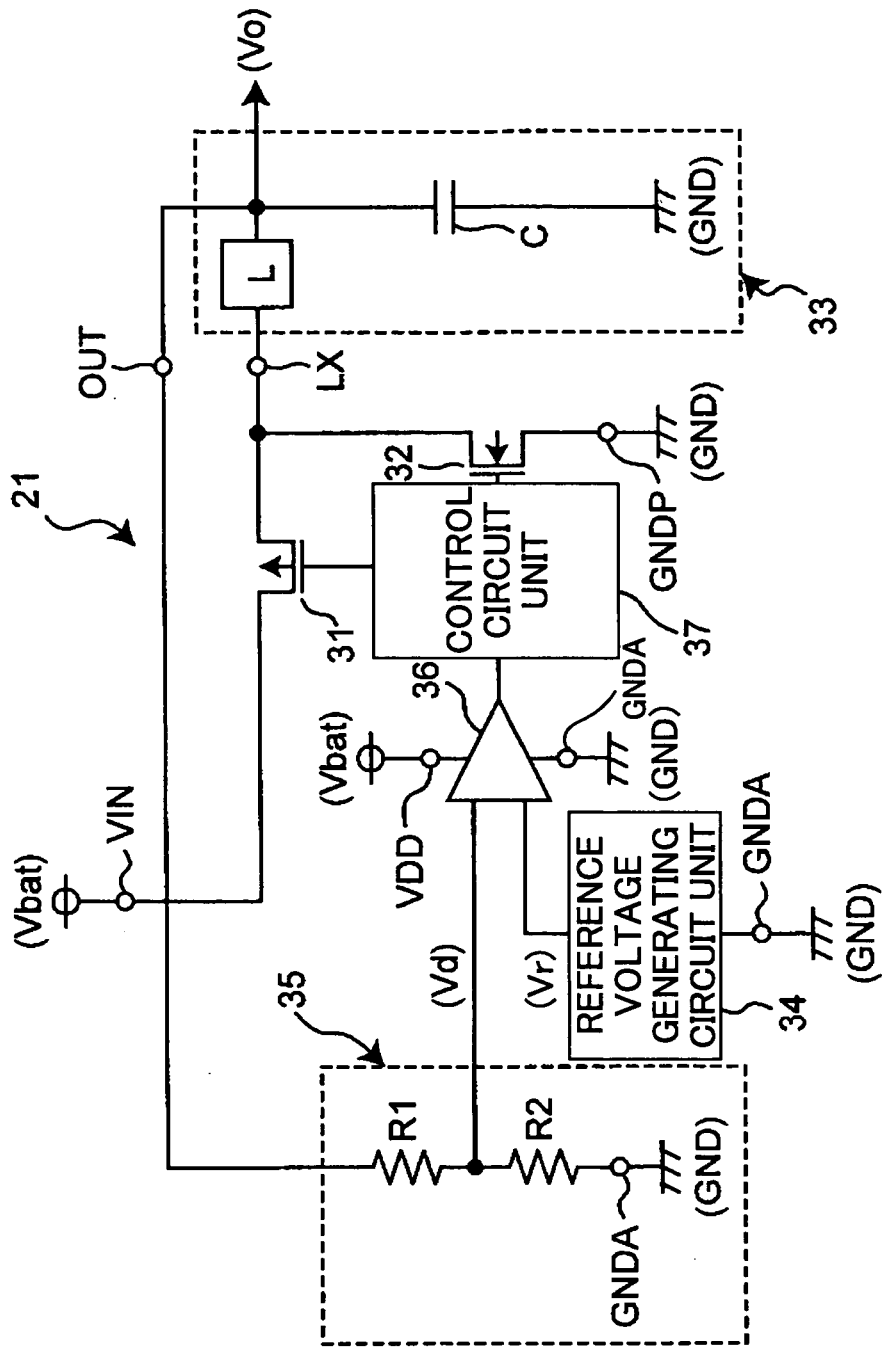
FIG. 3 is a circuit diagram showing an example of a switching regulator.

FIG. 3 is a circuit diagram showing an example of the switching regulator 21. FIG. 3 shows an example in which the switching regulator 21 is provided as a DC—DC converter of the synchronous detection type. The switching regulator 21 in FIG. 3 includes a P-channel-type MOS transistor (hereinafter referred to as a PMOS transistor) 31 serving as a driver transistor for switching, an N-channel-type MOS transistor (hereinafter referred to as an NMOS transistor) 32 serving as a driver transistor for switching, and a smoothing circuit unit 33 which smoothes the output of the PMOS transistor 31 and the NMOS transistor 32 for outputting.

The switching regulator 21 further includes a reference voltage generating circuit unit 34 for generating and outputting a predetermined reference voltage Vr, a potential dividing circuit unit 35 for dividing a potential Vo output from the smoothing circuit unit 33 to generate and output a divided potential Vd, an error amplifier 36 for amplifying an error of the divided potential Vd with respect to the reference voltage Vr and for outputting the amplified error, and a control circuit unit 37 for the switching control of the PMOS transistor 31 and the NMOS transistor 32 in response to the output of the error amplifier 36.

A pad VIN is coupled to the positive power supply voltage Vbat of the battery 11, and a pad GNDP is coupled to a negative power supply voltage GND of the battery 11. Between the pad VIN and the pad GNDP, the PMOS transistor 31 and the NMOS transistor 32 are connected in series, with the gate of the PMOS transistor 31 and the gate of the NMOS transistor 32 being coupled to the control circuit unit 3, respectively. The junction of the PMOS transistor 31 and the NMOS transistor 32 is connected to a pad LX. Between the pad LX and the negative power supply voltage GND, a coil L and a capacitor C are connected in series, together forming the smoothing circuit unit 33. The junction of the coil L and capacitor C serves as an output terminal of the switching regulator 21, outputting a predetermined voltage Vo.

The output voltage Vo is input into the potential dividing circuit unit 35 through a pad OUT for potential division by the potential dividing circuit unit 35. The divided potential Vd is supplied to one of the input ends of the error amplifier 36. The potential dividing circuit unit 35 includes a series connection of resistors R1 and R2. This series connection is situated between the pad OUT coupled to the output voltage Vo and a pad GNDA coupled to the negative power supply voltage GND. A junction of the resistors R1 and R2 is connected to one of the input ends of the error amplifier 36 for the provision of the divided potential Vd. The other input end of the error amplifier 36 receives the reference voltage Vr, and the output end of the error amplifier 36 is connected to the control circuit unit 37.

The output voltage Vo is divided by the potential dividing circuit unit 35, and the error amplifier 36 amplifies a difference between the divided potential Vd and the reference voltage Vr. The control circuit unit 37 is equipped with an oscillator (not shown) for generating a saw-tooth pulse signal, for example, and a comparator (not shown). The comparator compares the output signal of the oscillator with the output signal of the error amplifier 36. The comparator controls the ON time of the PMOS transistor 31 and the NMOS transistor 32 in response to the comparison. In so doing, the control circuit unit 37 alternately switches on the PMOS transistor 31 and the NMOS transistor 32, without switching on both at the same time. The signal output from the junction of the PMOS transistor 31 and the NMOS transistor 32 is smoothed by the smoothing circuit unit 33 comprised of the coil L and the capacitor C for output as the output voltage Vo.

Figure 4:
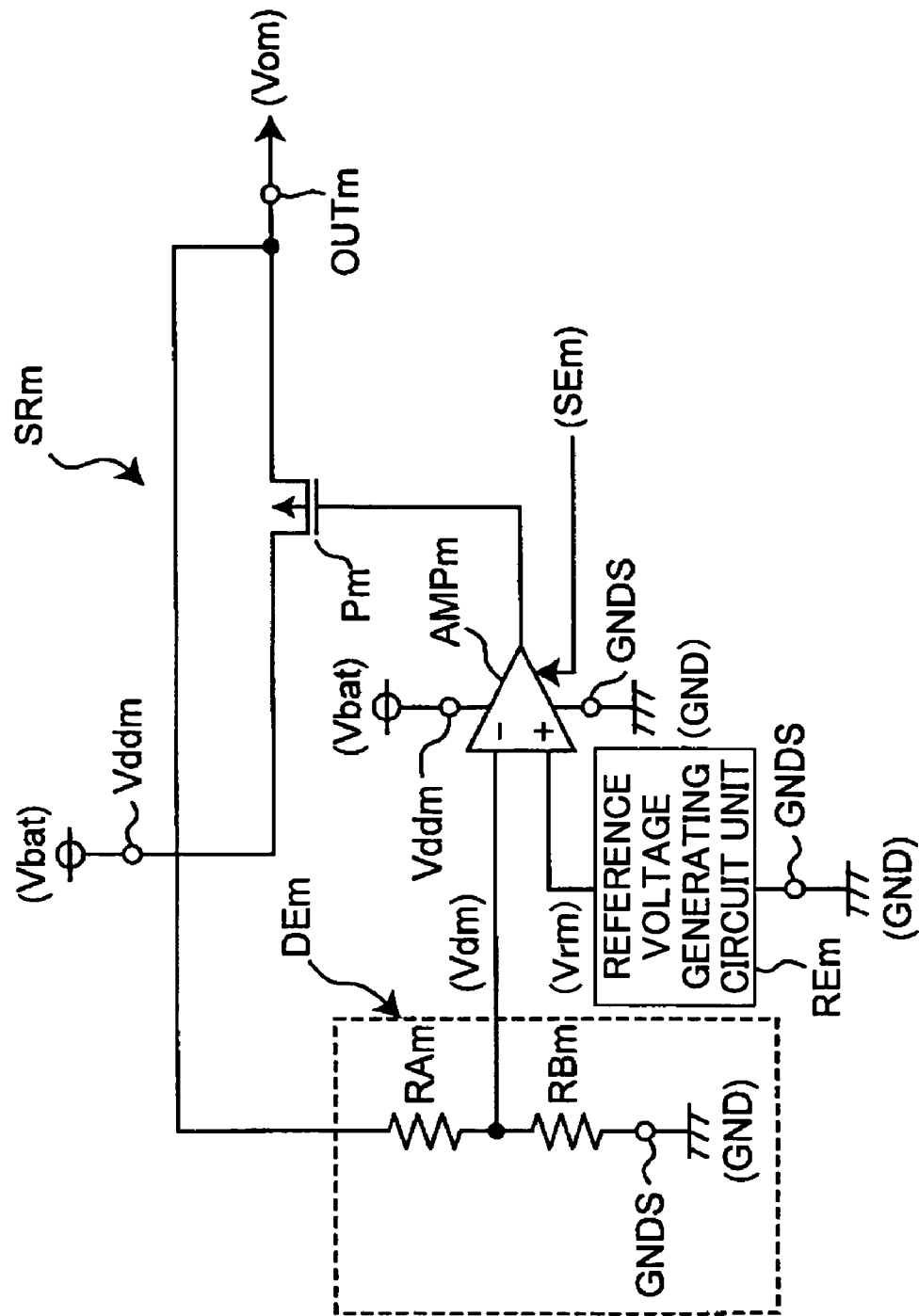
FIG. 4 is a circuit diagram showing an example of series regulators.

FIG. 4 is a circuit diagram showing an example of the series regulators SR1–SR3. The series regulators SR1–SR3 all have the same circuit construction. In FIG. 4, a series regulator SRm (m=1–3) is taken as an example for the illustration purpose. The series regulator SRm in FIG. 4 includes a reference voltage generating circuit unit REm for generating and outputting a predetermined reference voltage Vrm, a potential dividing circuit unit DEm, an error amplifier AMPm, and a PMOS transistor Pm that serves as a driver transistor to provide a pad OUTm with an electric current responsive to a potential input into the gate from the error amplifier AMPm.

The PMOS transistor Pm is situated between a pad Vddm coupled to the positive power supply voltage Vbat and a pad OUTm. A drain voltage of the PMOS transistor Pm is provided as an output voltage Vom. Resistors RAm and RBm, which together constitute the potential dividing circuit unit DEm, are connected in series between the pad OUTm and a pad GNDS coupled to the negative power supply voltage GND. The divided potential Vdm is output from the junction of the resistors RAm and RBm, and is input into the inverted input of the error amplifier AMPm.

The non-inverted input of the error amplifier AMPm receives the reference voltage Vrm, and the output of the error amplifier AMPm is connected to the gate of the PMOS transistor Pm. Further, the error amplifier AMPm receives an enable signal SEm from the CPU logic circuit unit 5. When the enable signal SEm is asserted, the error amplifier AMPm stops operation, so that the PMOS transistor Pm becomes non-conductive, thereby stopping the supply of the output voltage Vom.

The output voltage Vom is divided by the potential dividing circuit unit DEm. The error amplifier AMPm amplifies a difference between the divided potential Vdm and the reference voltage Vrm, and supplies its output to the gate of the PMOS transistor Pm. In this manner, the error amplifier AMPm controls the operation of the PMOS transistor Pm such as to keep the output voltage Vom at a desired voltage level.

Figure 5:
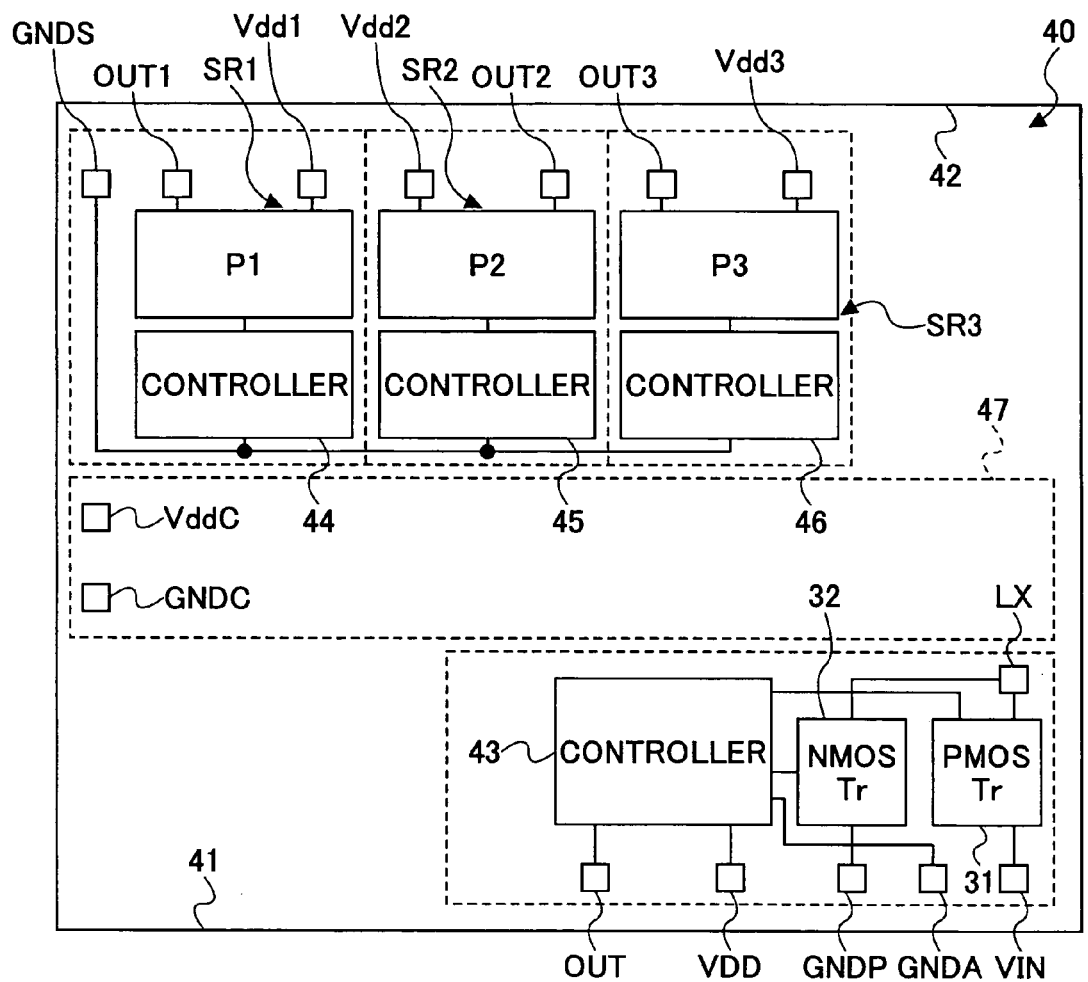
FIG. 5 is a schematic diagram showing a power supply IC that corresponds to the power supply circuit unit of FIG. 2.

FIG. 5 is a schematic diagram showing the power supply IC that corresponds to the power supply circuit unit 2 of FIG. 2. FIG. 5 illustrates an example of arrangement of the switching regulator 21 and the series regulators SR1–SR3 on an IC chip. A pad to which the enable signal SEm is supplied is omitted from illustration of FIG. 5. In FIG. 5, the PMOS transistor 31 (PMOSTr) and the NMOS transistor 32 (NMOSTr) of the switching regulator 21 are arranged near an edge 41 of a rectangular IC chip 40. The PMOS transistors P1–P3 of the respective series regulators SR1–SR3 are arranged near an edge 42 opposite the edge 41 of the IC chip 40. Moreover, the switching regulator 21 and the series regulators SR1–SR3 are situated near a diagonal line of the IC chip 40 (i.e., situated near the opposite corners of the IC chip 40).

Moreover, the reference voltage generating circuit unit 34, the potential dividing circuit unit 35, the error amplifier 36, and the control circuit unit 37 of the switching regulator 21 are provided at the position of a controller 43 shown in FIG. 5, which is close to the PMOS transistor 31 and the NMOS transistor 32. Likewise, the reference voltage generating circuit units RE1–RE3, the potential dividing circuit units DE1–DE3, and the error amplifiers AMP1–AMP3 of the respective series regulators SR1–SR3 are provided at the position of respective controllers 44–46 shown in FIG. 5, which are close to the respective PMOS transistors P1–P3.

Other circuits of the power supply circuit unit 2, i.e., the charge control circuit 25, the SIM card interface circuit 26, and the power-on logic circuit 27, are arranged at a center portion 47 of the IC chip 40. The pads VDD, VIN, Vdd1–Vdd3, and VddC are coupled to the positive power supply voltage Vbat of the battery 11. The pads GNDP, GNDA, GNDS, and GNDC are coupled to the negative power supply voltage GND of the battery 11. The coil L and the capacitor C of the smoothing circuit unit 33 are externally attached to the IC chip 40 through the pad LX.

Figure 6:
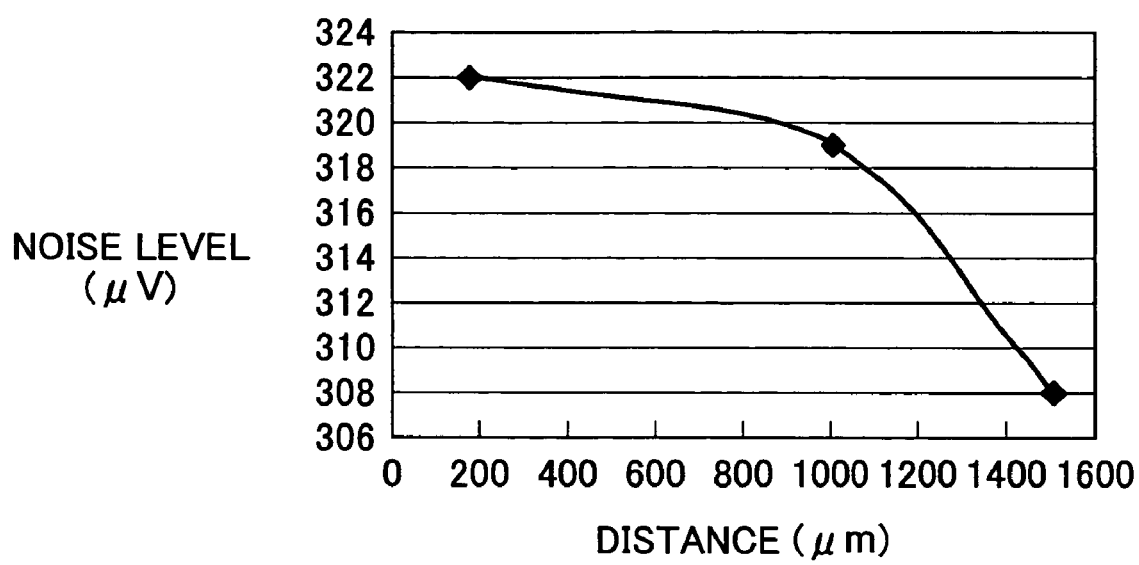
FIG. 6 is a diagram showing the relationship between noise levels and the distance between a switching regulator oscillating at 800 kHz and series regulators.

FIG. 6 is a diagram showing the relationship between noise levels and the distance between the switching regulator oscillating at 800 kHz and the series regulators. As can be seen from FIG. 6, a distance of 1.5 mm between the switching regulator and the series regulators provides a 5% noise reduction compared to when the distance between the switching regulator and the series regulators is 0.2 mm. The size of the power supply IC shown in FIG. 5 is 3 mm on a side. As shown in FIG. 5, the driver transistor of the switching regulator 21 is arranged near the edge 41, and the driver transistors of the series regulators SR1–SR3 are arranged near the edge 42. With this provision, an effect of the noise generated by the switching regulator 21 on the series regulators SR1–SR3 is successfully reduced.

Figure 7:
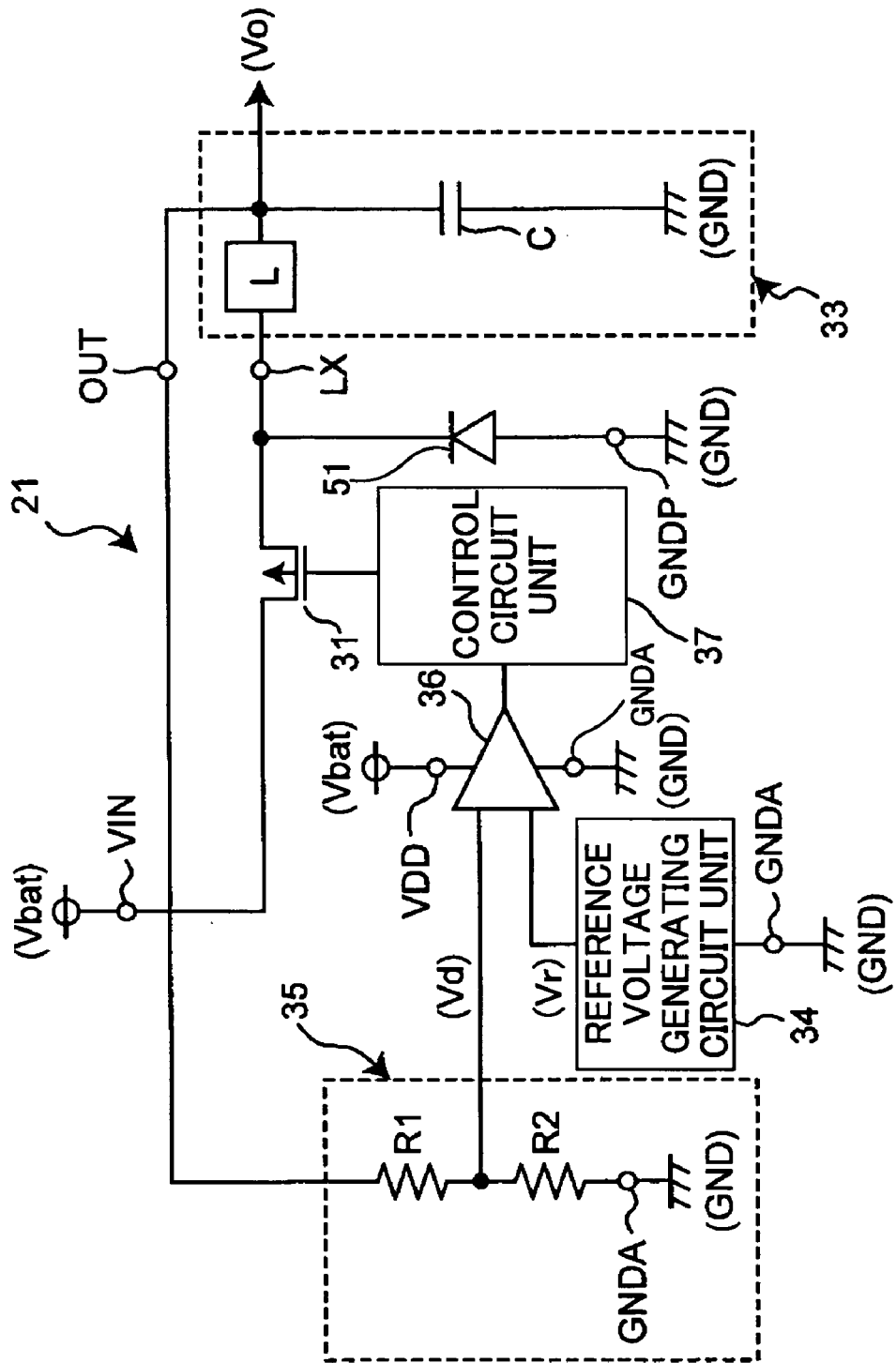
FIG. 7 is a circuit diagram showing another example of the switching regulator.

The above description has been provided with reference to an example in which a switching regulator functioning as a DC—DC converter of the synchronous detection type is used. In FIG. 3, however, a diode 51 may be used as a flywheel diode in place of the NMOS transistor 32. In such a case, the switching regulator 21 of FIG. 3 has a construction as shown in FIG. 7. In FIG. 7, the same elements as those of FIG. 3 are referred to by the same numerals and symbols. A switching regulator based on the use of a flywheel diode is well known in the art, and a description thereof will be omitted.

Figure 8:
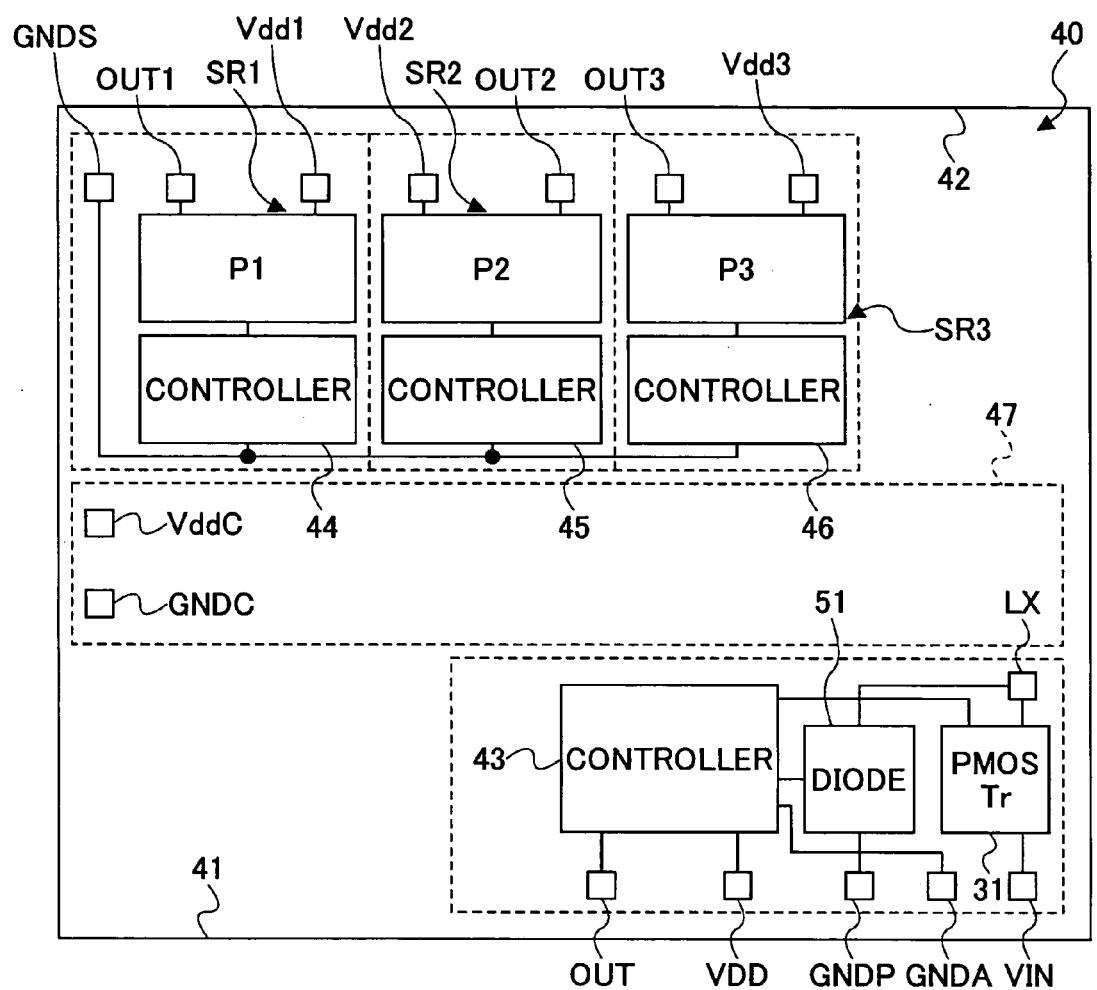
FIG. 8 is a schematic diagram showing a power supply IC when the switching regulator of FIG. 7 is used.

When the switching regulator as shown in FIG. 7 is used, a schematic diagram of the power supply IC is changed from that of FIG. 5 to that of FIG. 8. In FIG. 8, the same elements as those of FIG. 5 are referred to by the same numerals and symbols, and a description thereof will be omitted. In what follows, differences will only be described. FIG. 8 differs from FIG. 5 in that the diode 51 serving as a flywheel diode is provided in place of the NMOS transistor 32. Other construction is the same, and a description thereof will be omitted.

Figure 9:
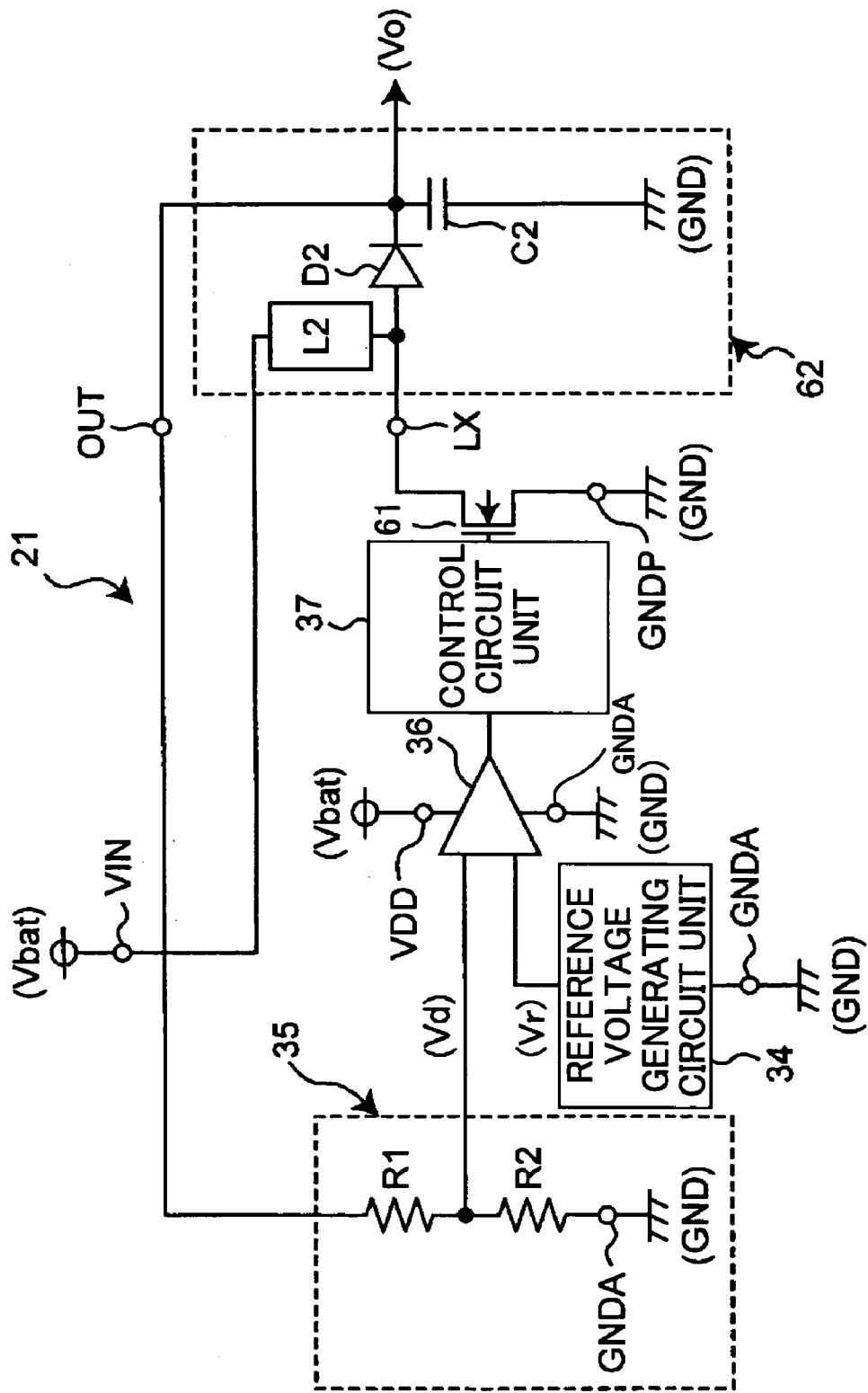
FIG. 9 is a circuit diagram showing another example of the switching regulator.

Moreover, FIG. 3 and FIG. 7 are directed to a case in which a voltage-reduction-type switching regulator is employed. If a boosting-type switching regulator is used, the circuit construction will be changed to that of FIG. 9. In FIG. 9, the same elements as those of FIG. 3 are referred to by the same numerals and symbols, and a description thereof will be omitted. In FIG. 9, the switching regulator 21 includes a NMOS transistor 61 serving as a switching transistor that switches in response to a control signal applied to the gate, a smoothing circuit unit 62 for smoothing the output signal of the NMOS transistor 61 for outputting of the smoothed signal, the reference voltage generating circuit unit 34, the potential dividing circuit unit 35, the error amplifier 36, and the control circuit unit 37 for the switching control of the NMOS transistor 61 in response to the output of the error amplifier 36.

The output voltage Vo is divided by the potential dividing circuit unit 35, and the error amplifier 36 amplifies a difference between the divided potential Vd and the reference voltage Vr. The control circuit unit 37 is equipped with an oscillator (not shown) for generating a saw-tooth pulse signal, for example, and a comparator (not shown). The comparator compares the output signal of the oscillator with the output signal of the error amplifier 36. The comparator controls the ON time of the NMOS transistor 61 in response to the comparison. The signal output from the NMOS transistor 61 is smoothed by the smoothing circuit unit 62 comprised of a diode D2 serving as a rectifying diode, a coil L2, and a capacitor C2. The smoothed signal is output as the output voltage Vo.

Figure 10:
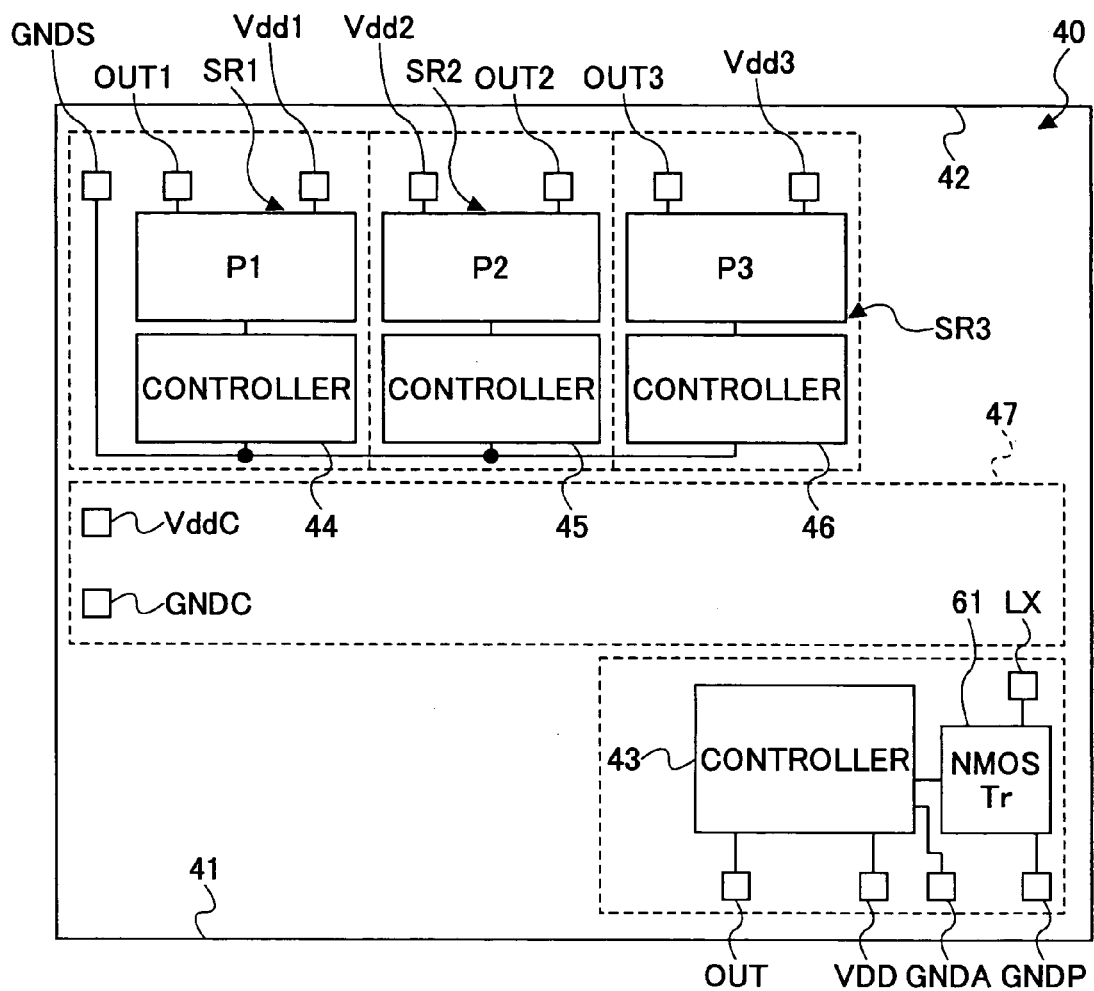
FIG. 10 is a schematic diagram showing a power supply IC when the switching regulator of FIG. 9 is used.

When the switching regulator as shown in FIG. 9 is used, a schematic diagram of the power supply IC is changed from that of FIG. 5 to that of FIG. 10. In FIG. 10, the same elements as those of FIG. 5 are referred to by the same numerals and symbols, and a description thereof will be omitted. In what follows, differences will only be described. FIG. 10 differs from FIG. 5 in that the PMOS transistor 31 is removed, and that the NMOS transistor 32 is replaced by the NMOS transistor 61. Other construction is the same, and a description thereof will be omitted.

The above embodiment has been described with reference to a case in which one switching regulator and three series regulators are provided. The present invention is not limited to such a configuration, and is applicable to a case in which at least one switching regulator and at least one series regulator are provided.

Further, the present invention is not limited to these embodiments, but various variations and modifications may be made without departing from the scope of the present invention.

The present application is based on Japanese priority application No. 2002-362149 filed on Dec. 13, 2002, with the Japanese Patent Office, the entire contents of which are hereby incorporated by reference.

What is claimed is:

1. An integrated circuit for supplying power, comprising:
   an IC chip having a rectangular shape and having a first edge and a second edge opposite the first edge;
   a switching regulator implemented on said IC chip and having a driver transistor whose ON time of switching is controlled to adjust an output voltage of said switching regulator; and
   a series regulator implemented on said IC chip, wherein said driver transistor of said switching regulator is positioned near the first edge and said series regulator is positioned near the second edge,
   wherein said series regulator and said driver transistor of said switching regulator are separated by a predetermined distance, and
   wherein said driver transistor of said switching regulator and said series regulator are positioned near opposite corners of said IC chip on a diagonal line of said IC chip.

2. The integrated circuit as claimed in claim 1, wherein said series regulator includes a driver transistor whose conductivity of an ON state is controlled to adjust an output voltage of said series regulator.

3. The integrated circuit as claimed in claim 1, wherein said series regulator supplies power to a high-frequency circuit.

4. The integrated circuit as claimed in claim 1, wherein said switching regulator and said series regulator receive a positive power supply voltage through respective different pads.

5. The integrated circuit as claimed in claim 1, wherein said switching regulator and said series regulator receive a negative power supply voltage through respective different pads.

6. The integrated circuit as claimed in claim 1, further comprising additional circuitry situated between said driver transistor of said switching regulator and said series regulator.

7. The integrated circuit as claimed in claim 1, wherein said switching regulator functions as a DC—DC converter of a synchronous detection type.

8. A communication apparatus, comprising:
   an IC chip having a rectangular shape and having a first edge and a second edge opposite the first edge;
   a switching regulator implemented on said IC chip and having a driver transistor whose ON time of switching is controlled to adjust an output voltage of said switching regulator;
   a plurality of series regulators implemented on said IC chip, wherein said driver transistor of said switching regulator is positioned near the first edge and said plurality of series regulators are positioned near the second edge; and
   a RF circuit unit including a transceiver for radio communication, wherein said driver transistor of said switching regulator and said plurality of series regulators are positioned near opposite corners of said IC chip on a diagonal line of said IC chip.

9. The communication apparatus as claimed in claim 8, wherein at least one of said plurality of series regulators supplies power to said RF circuit.

10. The communication apparatus as claimed in claim 8, wherein said switching regulator and at least one of said plurality of series regulators receive a positive power supply voltage through respective different pads.

11. The communication apparatus as claimed in claim 8, wherein said switching regulator and at least one of said plurality of series regulators receive a negative power supply voltage through respective different pads.

12. The communication apparatus as claimed in claim 8, further comprising additional circuitry situated between said driver transistor of said switching regulator and said plurality of series regulators.

13. The communication apparatus as claimed in claim 8, wherein said switching regulator functions as a DC—DC converter of a synchronous detection type.

* * * * *